3,316,055
PURIFICATION OF DRY CLEANING SOLVENTS WITH BONE CHAR

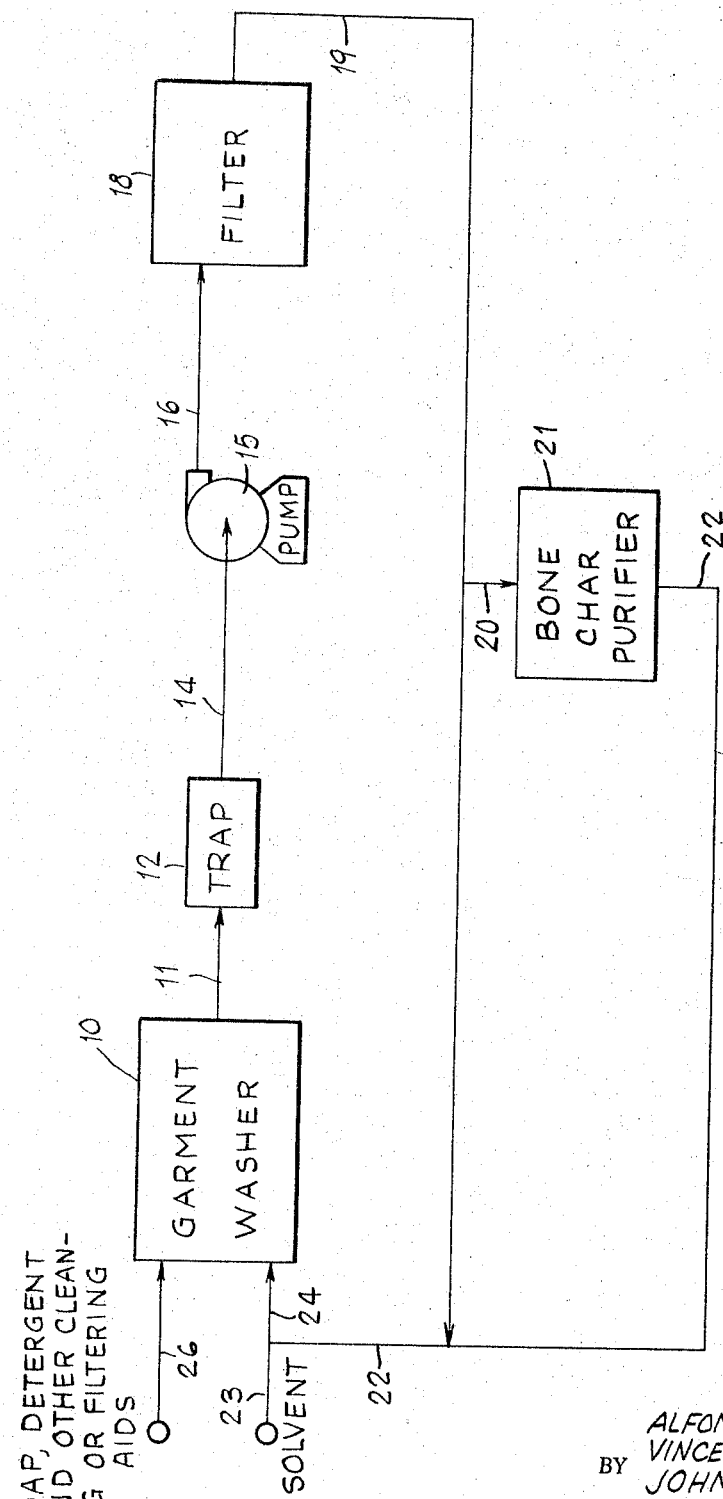

Alfonso Moncada, 21 3rd Place 11231; Vincent Moncada, 4015 5th Ave. 11232; and John Moncada, 150 21st St. 11232, all of Brooklyn, N.Y.
Filed Dec. 19, 1962, Ser. No. 245,816
16 Claims. (Cl. 8—142)

This invention relates to the dry cleaning of garments, fabrics and the like. More particularly, this invention relates to an improved dry cleaning operation for the cleaning of garments, fabrics and the like wherein a substantially anhydrous, organic solvent liquid is employed to remove, extract and/or dissolve dirt, grime, grease and the like from soiled garments and fabrics. In accordance with one embodiment this invention relates to an improved process for effecting purification or regeneration of the organic solvent liquid employed in a dry cleaning operation and containing contaminants, such as oil, grease, fats, dirt, grime and the like, dissolved therein. In accordance with another embodiment this invention relates to an improved dry cleaning process employing a special adsorbent material to effect the regeneration or purification of the dry cleaning solvent liquid intermittently and/or continuously during the dry cleaning operation.

In a conventional dry cleaning operation soiled garments, fabrics and the like are washed with a substantially anhydrous dry cleaning solvent, such as carbon tetrachloride, perchloroethylene or a petroleum base hydrocarbon solvent, such as Stoddard solvent or V.M. & P. naphtha, to release and/or dissolve dirt and grime and the like from the articles being cleaned. The thus-released dirt and grime may comprise solvent insoluble solid particles which remain suspended in the solvent liquid and/or may comprise solvent soluble materials which are dissolved in the solvent liquid. The suspended solid materials are readily removed from the solvent liquid by filtration.

It has been the practice to remove the solvent soluble contaminants from the solvent liquid by passing the contaminated solvent liquid through a mass or bed of activated carbon, such as activated carbon prepared from lignite, a coal-like material, activated by means of high temperature and steam and usually commercially available as finely-divided black powder, each particle of the powder being highly porous and sponge-like in structure.

In a dry cleaning operation it has been estimated that about 100 pounds of woolen garments release to the dry cleaning solvent liquid during the dry cleaning operation about one-half pound of solvent soluble contaminants or soil and about one pound of solvent insoluble soil. The insoluble soil or contaminants consist of dirt, grime, lint and other solids which are dispersed or suspended in the solvent liquid and are easily picked up and removed by passing the contaminated solvent liquid through a filter provided with a precoat of filter aid. The solvent soluble contaminants or soil, however, are dissolved in the solvent liquid and must be removed by means other than by filtration.

One technique used to effect removal of the solvent soluble contaminants involves the use of a selective adsorbent. The solvent soluble contaminants, as indicated hereinabove, are mostly organic materials and comprise usually wool-grease, fatty acids, grease, unsaponified fats, mineral oil, natural colors, dyes and other materials. If these solvent soluble materials are not removed from the solvent liquid prior to or during the dry cleaning operation the solvent liquid soon becomes unfit for dry cleaning purposes. Of the contaminants usually present in soiled garments and the like perhaps most troublesome and most undesirable contaminants are the fatty acids, usually identified in the trade as free fatty acids. Unless the fatty acid contaminants are removed from the solvent liquid an undesirable odor may be imparted to the garment during the dry cleaning operation.

In conventional dry cleaning operations various solvent aids are employed to effect the cleaning of the garments and to improve the effectiveness and versatility of the dry cleaning solvent employed therein. One such material or additive generally employed is a soap or surfactant which serves as a water emulsifying agent to form a stable water emulsion of any water which may accumulate in the dry cleaning solvent liquid due to the cleaning operations employed for the removal of water-soluble stains from the garments.

The surfactant or soap is usually added to the dry cleaning solvent liquid dissolved in a suitable solvent, such as an alcohol, which is miscible in water and in the dry cleaning solvent. A typical dry cleaning soap is the so-called mahogany soaps, e.g. sodium naphtha sulfonates.

It has been observed that when a conventional activated carbon is employed as the selective adsorbent to remove dissolved contaminants from the dry cleaning solvent liquid, the activated carbon tends also to adsorb the dry cleaning soap and other aids added to the dry cleaning solvent liquid to the detriment of the dry cleaning operation. It would appear that in some instances conventional activated carbons adsorb and remove these soaps and other dry cleaning aids, such as other surfactants or emulsifying agents, from the dry cleaning solvent preferentially to the fatty acids and other contaminants.

Accordingly, it is an object of this invention to provide an improved dry cleaning operation.

Another object of this invention is to provide an improved adsorbent for use in a dry cleaning operation in connection with the purification and/or regeneration of the dry cleaning solvent liquid.

Still another object of this invention is to provide a dry cleaning process which yields a brighter and cleaner garment.

Yet another object of this invention is to provide a dry cleaning process employing a special selective adsorbent which prolongs the life and increases the effectiveness of the dry cleaning solvent, exhibits less tendency to preferentially adsorb soaps and other dry cleaning aids over fatty acid contaminants in the dry cleaning solvent and which permits the use of higher proportions of dry cleaning solvent aids, such as soaps, in a dry cleaning operation with a resulting more effective dry cleaning solvent and a better dry cleaning operation.

How these and other objects of this invention are accomplished will become apparent in the light of the accompanying disclosure made with reference to the accompanying drawing which schematically illustrates a dry cleaning operation employing the special selective adsorbent in accordance with this invention.

In accordance with this invention we have now discovered that an improved dry cleaning process and an improved method of purifying and/or maintaining a dry cleaning solvent liquid in satisfactory condition for use in a dry cleaning operation is provided by employing bone char or bone black as a selective adsorbent and causing the dry cleaning solvent liquid containing contaminants dissolved therein to come into contact with the bone char or bone black so as to effect at least partial removal of the contaminants dissolved in said dry cleaning solvent liquid by selective adsorption on said bone char.

Bone char or bone black is a commercially available product and is the residue obtained by the destructive distillation of animal bones. A typical bone char of American manufacture, freshly prepared, would have the following analysis.

| Component: | Percent by wt. |
|---|---|
| Carbon | 8.55 |
| Insoluble silica | 0.25 |
| Calcium sulfate | 0.06 |
| Calcium sulfide | 0.05 |
| Calcium carbonate | 8.90 |
| Iron | 0.06 |
| Undetermined (calcium phosphate) | 82.13 |

Bone char is available in various particle size, from a relatively fine powder up to granules, such as particles having a size in the range smaller than 10 mesh but larger than 30 mesh or particles smaller than 30 mesh and larger than 50 mesh.

Various types of bone char may be employed in the practice of this invention. Natural bone char, i.e. the residue obtained by the destructive distillation of animal bones, is preferred. Other, so-called synthetic bone chars are also useful in the practice of this invention. For example, synthetic bone chars manufactured and sold by The Baugh Chemical Company of Baltimore, Md., under the trademark Synthad are useful in the practice of this invention. Various materials and methods may be employed for the manufacture of these synthetic bone chars, see U.S. Patents 2,170,601, 2,226,421, 2,352,932, 2,735,823, 2,831,818, 2,914,431 and 3,021,287. The disclosures with respect to the manufacture of synthetic bone chars set forth in each of these patents are herein incorporated and made part of this disclosure.

Generally, these synthetic bone chars are prepared by admixing finely-divided natural bone meal with a carbonizable material and heating the admixture. U.S. 2,170,601 discloses the manufacture of synthetic bone char by admixing finely-divided bone meal, carbonizable material and heat decomposable salts, such as ammonium phosphate, and subjecting the resulting admixture to an elevated temperature to char the carbonizable material therein. U.S. 2,352,932 discloses the preparation of a synthetic bone char by forming an admixture of calcium phosphate, clay and a carbonizable material and subjecting the resulting admixture to a temperature sufficient to carbonize the carbonizable material. U.S. 2,735,823 discloses substantially the same method of preparation but includes the addition of activated carbon to the admixture prior to carbonization. U.S. 2,831,818 discloses the preparation of a synthetic bone char by forming an admixture of steamed bone and clay, and preferably a carbonizable material, and subjecting the resulting admixture to a high temperature to effect carbonization. U.S. 3,021,287 discloses the preparation of a synthetic bone char by carbonizing an admixture of steamed bone and starch.

Other materials and techniques for the preparation of synthetic bone char include forming an admixture of activated carbon, 5–60% by weight, together with an inorganic material, 20–90% by weight, capable of neutralizing or reacting with fatty acids of the type usually found as a contaminant in dry cleaning solvents, e.g. oleic acid, to form corresponding soaps and a suitable binder. Suitable such inorganic materials would appear to be the alkaline or weakly alkaline, calcium, magnesium, barium and strontium compounds including calcium carbonate, magnesium carbonate and mixtures thereof, as well as the various corresponding phosphates, such as the calcium phosphates. There may also be included a small amount, 1–10% by weight, of calcium and/or magnesium oxides or hydroxides.

Accordingly, in the accompanying disclosure and claims bone char or bone black, unless otherwise indicated, is meant to include not only natural bone char, the residue from the destructive distillation of bones, but also the above-described synthetic bone chars, as well as mixtures of natural and synthetic bone chars.

The bone char, when employed in a dry cleaning process or when employed to effect the purification of contaminated dry cleaning solvent in accordance with this invention, may be in the form of a fixed bed of bone char through which the contaminated dry cleaning solvent liquid is flowed or percolated, or may be employed as a filter medium or as a precoat, such as in a conventional filter, e.g. cartridge type filter.

In accordance with one embodiment, finely-divided or powdered bone char or bone black may be employed not only as a filtering medium for the removal of suspended insoluble contaminants from the dry cleaning solvent but at the same time to serve as a selective adsorbent for the removal of the soluble contaminants from the dry cleaning solvent liquid as the contaminated dry cleaning solvent liquid flows in contact therewith.

Various solvents, well known in the trade, may be employed to effect the dry cleaning of garments and the like and are satisfactorily treated and purified in accordance with this invention. These dry cleaning solvents include not only the well known, relatively low flash hydracarbon or petroleum solvents, such as V.M. & P. naphtha, Stoddard solvent, but also the halogenated hydrocarbons, such as the halogenated $C_1$ and $C_2$ hydrocarbons, e.g. carbon tetrachloride, perchloroethylene and a recently introduced halogenated hydrocarbon dry cleaning solvent, believed to be a chlorofluoroethylene, manufactured and sold by E. I. du Pont de Nemours & Co., Inc., under the trademark Valclene.

Reference is now made to the accompanying drawing which schematically shows the application of the invention to a typical dry cleaning operation. As illustrated therein soiled garments, fabrics and the like are introduced into garment washer 10 which may be a barrel-like closed structure which is provided with a suitable amount of dry cleaning solvent, such as perchloroethylene. The soiled garments are tumbled, washed or otherwise admixed with the dry cleaning solvent within washer 10. After a suitable period of time the resulting washed dry cleaning garments are removed.

After the solvent in washer 10 has undergone a number of washing operations it becomes contaminated with the soluble and insoluble soil removed from the garments. When the contaminant level in the solvent reaches an undesirable level the solvent is removed from washer 10 and passed via line 11 through trap 12 which serves to remove any relatively large solid foreign bodies, such as pins, buttons, pieces of fabric, etc. From trap 12 the solvent is passed via line 14 to pump 15 from which it is pumped via line 16 to filter 18. Filter 18 may be any suitable filtering medium, cloth or wire screen, desirably provided with a precoat of diatomaceous earth or similar filter aid, and serves to remove any finely-divided suspended insoluble contaminants from the dry cleaning solvent.

The resulting solids-free dry cleaning solvent, now containing substantially only solvent soluble contaminants therein, is removed from filter 18 via line 19. At least a portion of the solvent removed from filter 18 via line 19 is passed via line 20 through bone char purifier 21. Bone char purifier 21 is provided with a fixed bed or mass of granular bone char. As the contaminated dry cleaning solvent flows through purifier 21 in contact with the bone char therein the solvent soluble contaminants, particularly the fatty acids, are removed therefrom by selective adsorption onto the bone char within purifier 21.

The resulting purified dry cleaning solvent, now substantially free of undesirable solvent soluble contaminants, is removed from purifier 21 via line 22 and returned to washer 10 via line 24 as purified dry cleaning solvent to contact and to wash additional garments. As required, make-up dry cleaning solvent is supplied from a suitable source to washer 10 via lines 23 and 24. If desired, all of the dry cleaning solvent recovered from filter 18 via line 19 may be passed via line 20 through purifier 21. It may be more convenient, however, depending upon the contaminant level in the dry cleaning solvent for the operator, as indicated in the drawing, to pass only a portion, such as about 20–80% of the solvent leaving filter 28 via line 19 through purifier 21, passing the remainder 80–20% directly via lines 19, 22 and 24 to garment washer 10, thereby bypassing a portion of the solids-free solvent around bone char purifier 21. From time to time as indicated in the drawing various additives or filter aids may be added to the dry cleaning system via line 26 directly to washer 10. Preferably, and necessarily when diatomaceous earth is added via line 26 to washer 10 as a filter aid to precoat filter 18, these additive materials are added to the dry cleaning solvent in washer 10 in the absence of garments therein.

The aforesaid operations may be carried out intermittently or continuously. In a large installation a large number of washers 10 or a large capacity washer 10 may be employed in combination with the other elements shown in the drawing, in this situation the practice of this invention may be carried out on a substantially continuous basis. In a relatively small installation the purification of contaminated dry cleaning solvent may be carried out intermittently or in a batch operation when the contaminant level, particularly fatty acid content of the dry cleaning solvent, reaches an undesirably high level.

In actual practice it has been observed that garments dry cleaned with solvents, such as perchloroethylene, purified by contact with bone char in accordance with this invention are brighter and cleaner as compared with garments which have been cleaned under substantially the same conditions and employing substantially the same solvent but employing activated carbon instead of bone char as the solvent purifying agent. Also, it has been observed that by employing bone char as the purifying agent soap consumption during the overall dry cleaning operation is substantially reduced, by about 30–50%. This drastic reduction in soap consumption is attributed to the fact that bone char adsorbs a smaller amount of dry cleaning soaps as compared with activated carbon. This reduction in soap consumption materially reduces the cost of the dry cleaning operation.

Further, because of the reduced adsorption or consumption of dry cleaning soap exhibited by bone char it is possible to effect a better and more versatile dry cleaning operation. For example, since bone char shows less affinity to adsorb dry cleaning soap than activated carbon, higher levels of soap and stronger solvent dry cleaning formulations can be employed to effect a better removal of water-soluble stains and other stains from the soiled garments undergoing dry cleaning.

The outstanding benefit in the practice of this invention obtainable by employing bone char as the purifying agent results from the improved removal of the free fatty acids from the dry cleaning solvent liquid. In a dry cleaning operation it is desirable to keep the free fatty acid content in the dry cleaning solvent liquid at a minimum. As indicated hereinabove, this goal is difficult to attain when activated carbon is employed since dry cleaning soaps tend to be preferentially adsorbed on activated carbon thereby tending to reduce the adsorption and removal of the undesirable free fatty acids from the dry cleaning solvent. When, in accordance with this invention, bone char is employed as the purifying agent, the reverse appears to be true. Free fatty acids appear to be preferentially adsorbed on bone char over the dry cleaning soaps, and indeed, it would appear that the adsorbed free fatty acids are converted on the bone char to the corresponding calcium salts due to the alkaline nature of bone char, e.g. a pH in the range 9–10.5. It would appear that there is some free lime or similar alkaline chemically active material in the bone char which effects neutralization of the adsorbed free fatty acids to the corresponding soaps, such as calcium soaps.

The above described dry cleaning operations involving washing, filtering and purifying are usually carried out at room temperature, such as a temperature in the range 50–125° F., more or less, and at about ambient atmospheric pressure or whatever pressure may normally be required to cause the flow of the contaminated dry cleaning solvent liquid through the filter and bed of bone char and the return of the resulting purified dry cleaning solvent liquid to the washer.

As will be apparent to those skilled in the art in the light of the foregoing disclosure, many modifications, alterations and substitutions are possible in the practice of this invention without departing from the spirit or scope thereof.

We claim:

1. In a dry cleaning operation wherein garments and the like are washed by contact with a dry cleaning solvent liquid to remove contaminants such as solvent soluble free fatty acids, the dry cleaning solvent liquid, now containing free fatty acids dissolved therein, removed from contact with the garments and treated for the removal of solvent soluble contaminants therein by contact with a solid adsorbent, the improvement which consists essentially of employing as said solid adsorbent particle-form bone char whereby the solvent soluble free fatty acids are preferentially removed from said dry cleaning solvent liquid and converted by said bone char to the corresponding calcium soaps.

2. A method in accordance with claim 1 wherein said dry cleaning solvent is perchloroethylene.

3. A method in accordance with claim 1 wherein said dry cleaning solvent is carbon tetrachloride.

4. A method in accordance with claim 1 wherein said dry cleaning solvent is V.M.&P. naptha.

5. A method in accordance with claim 1 wherein said dry cleaning solvent is Stoddard solvent.

6. A method in accordance with claim 1 wherein said dry cleaning solvent is a petroleum hydrocarbon fraction having a flash point not lower than 100° F. Tagalube open cup test.

7. A method in accordance with claim 1 wherein said dry cleaning solvent is selected from the group consisting of a petroleum base hydrocarbon dry cleaning solvent and a halogenated hydrocarbon.

8. A method of purifying dry cleaning solvent liquid contaminated with organic materials, such as wool grease, fatty acids, unsaponified fats, oils and the like, dissolved therein which consists essentially of contacting said contaminated dry cleaning liquid with particle-form bone char to preferentially remove said fatty acids from said contaminated dry cleaning liquid and to convert said fatty acids to the correspondings calcium soaps.

9. A method of dry cleaning fabrics, garments and the like, which consists essentially of washing said garments, fabrics and the like with a dry cleaning solvent liquid to remove dirt, grease, grime, solvent soluble free fatty acids and other contaminants therefrom, recovering said dry cleaning solvent liquid, now containing the aforesaid contaminants suspended and/or dissolved therein, from the washing operation, filtering the recovered dry cleaning solvent liquid to remove undissolved, suspended solid materials therefrom, contacting the resulting substantially solids-free, filtered dry cleaning solvent liquid, now containing the solvent soluble free fatty acids dissolved therein, with a mass of bone char to effect at least partial removal of the contaminants dissolved in said dry cleaning solvent liquid and to preferentially remove the solvent soluble free fatty acids from said cleaning solvent liquid and to convert said free fatty acids to the corresponding calcium soaps and returning the resulting, substantially contaminant-free dry cleaning solvent liquid to contact additional garments, fabrics and the like to clean the same.

10. A method in accordance with claim 9 wherein said mass of bone char is in the form of a stationary fixed bed of particle-form bone char and wherein said contacting operation is carried out by flowing said filtered dry cleaning solvent liquid through a fixed bed of bone char.

11. A method in accordance with claim 9 wherein said bone char has a particle size in the range smaller than 10 mesh and greater than about 30 mesh.

12. A method of purifying dry cleaning solvent liquid containing a water-emulsifying agent therein and contaminated with organic materials, such as wool grease, fatty acids, unsaponified fats and the like dissolved therein, which consists essentially of contacting said contaminated dry cleaning solvent liquid with particle-form bone char to effect the selective adsorption and removal of said contaminating organic materials from said dry cleaning solvent liquid, said fatty acids being preferentailly adsorbed by said bone char and converted by said bone char to the corresponding calcium soaps.

13. A method in accordance with claim 12 wherein said water-emulsifying agent is a preferentially oil-soluble soap.

14. A method in accordance with claim 12 wherein said water-emulsifying agent is a sodium naptha sulfonate.

15. A method of purifying dry cleaning solvent liquid contaminated with solvent soluble fatty acid materials dissolved therein which consists essentially of contacting said contaminated dry cleaning solvent liquid with particle-form natural bone char, the residue of the destructive distillation of animal bones, to effect removal of said fatty acid materials from said dry cleaning solvent liquid, said bone char removing said fatty acid materials from said contaminated dry cleaning solvent liquid and converting said fatty acid materials to the corresponding calcium soaps.

16. A method of purifying dry cleaning solvent liquid contaminated with solvent soluble fatty acid materials dissolved therein, said materials tending to accumulate in the solvent liquid when the solvent liquid is employed in a dry cleaning operation, which consists essentially of contacting said contaminated dry cleaning solvent liquid with particle-form synthetic bone char, said synthetic bone char comprising an admixture of activated carbon and an inorganic material capable of reacting with or neutralizing said fatty acid materials, to effect removal of said fatty acid materials from said dry cleaning solvent liquid and conversion of said fatty acid materials to their corresponding soaps.

References Cited by the Examiner

UNITED STATES PATENTS

| | | | |
|---|---|---|---|
| 1,545,091 | 7/1925 | Flowers | 8—142 |
| 1,990,691 | 2/1935 | Hatfield | 8—142 |

OTHER REFERENCES

Gregory: Use and Applications of Chemical and Related Materials, Reinhold, New York, pp. 110, 1939.

Merck Index, 7th edition, pp. 210, 1960.

NORMAN G. TORCHIN, *Primary Examiner.*

J. CANNON, *Assistant Examiner.*